Oct. 9, 1934.　　　　C. R. DALE ET AL　　　1,976,216
INCLINATION RECORDING INSTRUMENT FOR ROTARY STRINGS
Filed Feb. 4, 1930　　　2 Sheets-Sheet 1
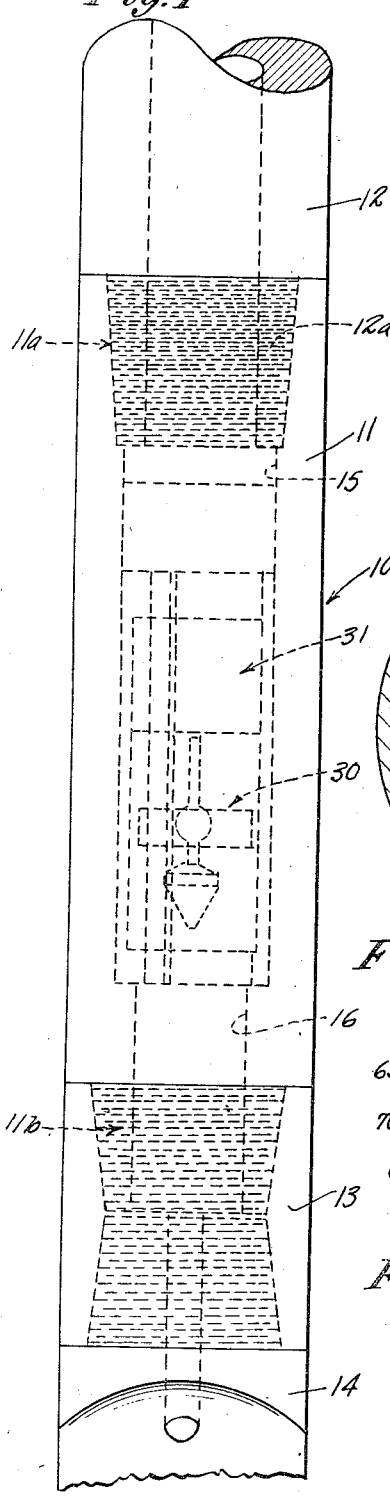
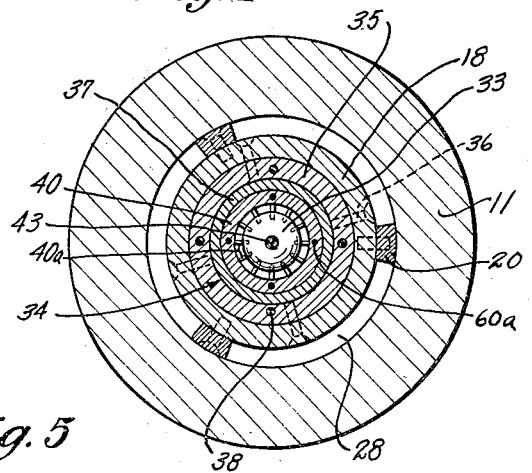
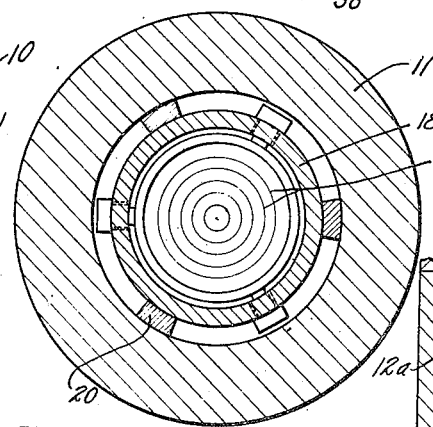
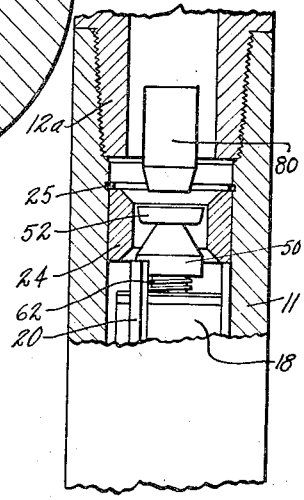
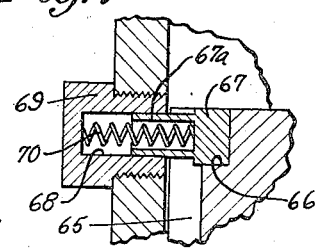
Inventors
Clarence R. Dale,
Lester C. Nielson.
Attorney.

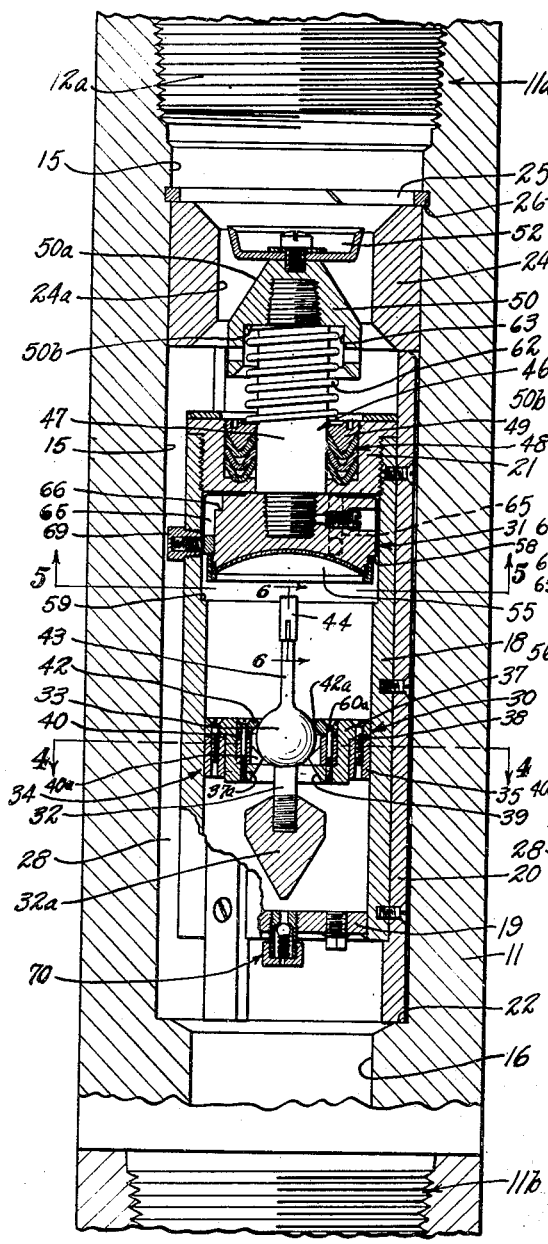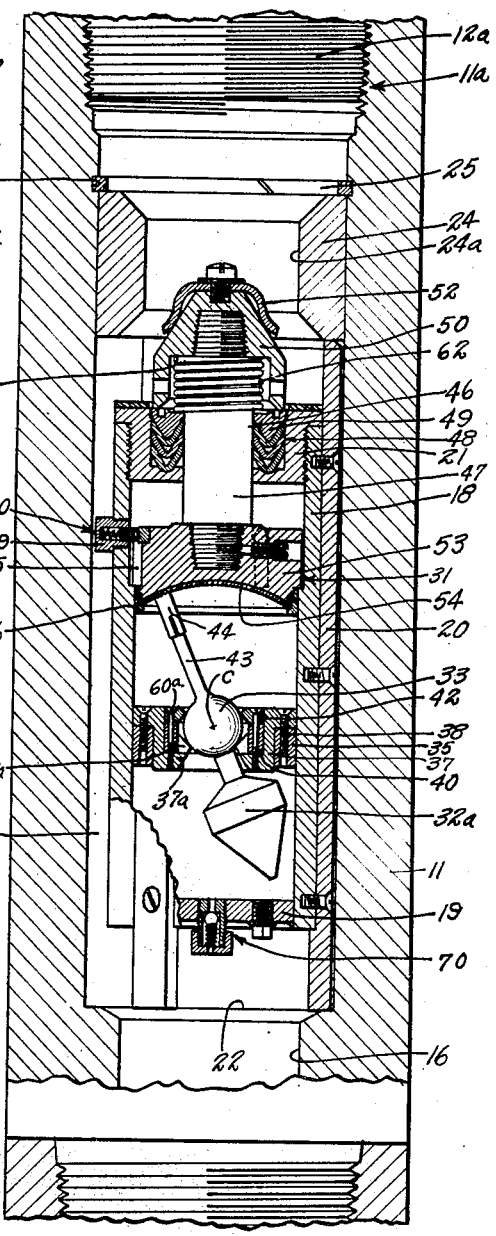

Patented Oct. 9, 1934

1,976,216

UNITED STATES PATENT OFFICE 1,976,216

INCLINATION RECORDING INSTRUMENT FOR ROTARY STRINGS

Clarence R. Dale, Hollywood, and Lester C. Nielson, Los Angeles, Calif., assignors, by mesne assignments, to Hydril Company, Los Angeles, Calif., a corporation of California Application February 4, 1930, Serial No. 425,778

3 Claims. (Cl. 234—5.3)

This invention has reference to devices for determining the course followed by well bores in the earth, and has for its general object to provide an instrument which is particularly adapted for recording the vertical deviation in oil wells drilled by the rotary method.

It is commonly known that in the drilling of wells, the well bore frequently, and in fact usually deviates from a true vertical course to such an extent as to necessitate drilling a distance considerably in excess of the vertical depth of the oil bearing strata in order to reach same. Often times difficulties are encountered in drilling operations as a result of such deviations, especially in case the well bore is particularly crooked. And if extremely hard or slanting formations are encountered, the well may deviate so widely from the vertical as to entirely miss the strata or oil bearing zone sought for. According to the usual practice, it is attempted to maintain the well in a more or less vertical course by lowering an orienting or deviation recording instrument in the well at different stages during the drilling, and obtaining readings of the vertical inclination of the well, in order that steps may be taken to straighten its course in case the deviation exceeds that permitted.

The present instrument is of the type adapted to be applied to a drill pipe, and which operates to take a single record of the inclination for each lowering within the well, the instrument requiring re-setting or readjustment between the taking of successive readings. It is therefore necessary to lower the instrument within the well to the depth at which a reading is to be taken, and thereafter to raise it to the ground level for inspection and readjustment. Since in the course of drilling operations the drill pipe must be pulled at intervals to replace the bit, or for other reasons, it is desirable for obvious savings in time and expense, that the records of the well deviation be taken during the same lowerings of the drill pipe normally required for drilling. This, however, is impossible by the use of the usual inclination recording device, since, assuming that it might be carried at an intermediate point in the drill pipe with the bit attached below, no provision is made for enabling the circulation to be carried on past the instrument, and as a result the taking of a reading and the carrying out of a drilling operation each require the making of separate round trips into the well.

The present invention enables the taking of a reading of the well inclination and the resumption of drilling operations for a single lowering of the drill pipe, by providing an instrument which may be caused to operate at any desired time and depth to record the inclination, and which permits the flow of circulating fluid through the pipe string to the drill bit at all times, thereby enabling drilling operations to be carried on in the usual manner.

The instrument may be characterized generally as comprising a device which operates to indicate the inclination of the instrument with respect to the vertical, and means controllable by a medium passed downwardly through the drill pipe, preferably circulating fluid, for recording the position of the indicating device at any given time. The recording apparatus is contained within a fluid tight capsule seated within a housing or barrel which preferably is especially designed to be carried immediately above the drill collar. A clearance space is provided between the capsule and the wall of the barrel in order that the flow of circulating fluid may be maintained at all times through the barrel, thereby enabling drilling operations to be carried on with the instrument in the pipe string.

The inclination indicating device comprises a pendulum mounted for universal swinging movement and which is free to assume a vertical position within the capsule until it becomes locked in engagement with the recording means at the point the record is taken. The pendulum has above its point of support a vertical extension or arm terminating in a marking die, the center of which is at the longitudinal axis of the pendulum and its extension arm. Extending through the upper end of the capsule is a plunger carrying on its lower end within the capsule, a recording element, preferably in the form of a spherical segment, the radius of curvature of which is equal to the length of the die-carrying pendulum arm from its center of swinging. The plunger which actuates the recording element is adapted to be operated by the circulating fluid to force the recording element downward into engagement with the marking die on the free end of the pendulum arm, causing the die to mark upon or penetrate the recording element. The latter is automatically locked in engagement with the die so that the die cannot be disengaged until the instrument has been raised to the surface and opened. A reading of the vertical inclination thus is obtained by measuring the radial distance of the die marking from the center of the recording element.

Having set forth the general objects and aspects of our invention, we will now proceed to a detailed description of a typical and preferred embodiment of our invention from which a full understanding thereof will be had. Reference is made throughout the description to the accompanying drawings, in which Figure 1 is a general view showing the inclination recording instrument carried in a pipe string above a drill collar;

Fig. 2 is an enlarged medial sectional view through the instrument, the recording element and the operating plunger being shown in raised or pendulum releasing position;

Fig. 3 is a view similar to Fig. 2 illustrating the recording element and the plunger locked in their lower or pendulum engaging position, the pendulum being shown, for purposes of illustration, in inclined position;

Fig. 4 is a section on line 4—4 of Fig. 2 showing particularly the pendulum mounting;

Fig. 5 is a section on line 5—5 of Fig. 2 presenting a bottom view of the recording element;

Fig. 6 is a fragmentary enlarged section through the pendulum marking die as indicated on line 6—6 of Fig. 2;

Fig. 7 is an enlarged detailed view of one of the locking devices; and

Fig. 8 is a reduced fragmentary sectional view above the upper end portion of the capsule, showing the use of an object dropped within the drill pipe for operating the plunger.

Referring first to Figure 1 of the drawings, the inclination recording device, generally indicated at 10, is shown to be housed within a barrel 11 joined at its upper end to the drill pipe 12 and carrying on its lower end the usual drill collar 13 and drill bit 14. It will be understood, of course, that the instrument may be carried at any suitable point in the pipe string, it preferably, however, being positioned, as shown, immediate above the drill collar. The barrel 11 has a comparatively enlarged bore 15, extending from its upper box end 11a into which the pin end 12a of the drill pipe is threaded, throughout the greater portion of its length, and a reduced bore 16 extending through the lower pin end 11b of the barrel which is threaded into the drill collar. Within bore 15 is inserted a fluid tight capsule comprising a tubular shell 18 having a bottom closure 19 which may conveniently be welded in place, and a top closure in the form of a packing gland plug 21, which will be more fully described hereinafter. To the outside of the capsule shell is secured a plurality of circumferentially spaced strips or ribs 20 which project somewhat beyond the ends of the capsule. Ribs 20 have footing upon annular shoulder 22 between bores 15 and 16, thereby providing support for the capsule. The ribs preferably have a smooth sliding fit within the barrel bore in order to prevent lateral jarring of the capsule and resultant damage to the indicating mechanism. In addition to their providing supports for the capsule, ribs 20 also serve as spacers between the capsule and barrel wall, to form the longitudinal and annular circulating fluid spaces or passages 28. A bushing 24 having a snug fit within bore 15, is rested on the upper ends of ribs 20, and the capsule and bushing assembly is locked within the barrel by means of a split ring 25 seated in an annular recess 26 in the bore wall immediately above the bushing.

It may be mentioned at this point that the flow of circulating fluid from the drill pipe to the bit is maintained through the instrument barrel by way of bushing bore 24a, annular space 28 between the capsule and the wall of bore 15, the space between ribs below the capsule, and bore 16. The clearance between the capsule and barrel is such that no undue restriction is offered the circulating fluid in passing through the barrel.

Within the capsule 18 is contained the inclination finding or indicating device generally indicated at 30, and the inclination recording means at 31 in the upper interior of the capsule. The inclination indicator or finder comprises a pendulum 32 carrying a tapered bob 32a, so shaped as to allow the pendulum to swing through a maximum arc permitted by the barrel diameter, as will be seen from Figure 3 wherein the pendulum is shown to be swung to an outer position. The stem of the pendulum has a spherical enlargement 33 which has bearing on a supporting table structure 34. Any suitable mounting for the pendulum may be provided, although it is required that the mounting be such as will render the pendulum sensitive to slight inclination of the instrument, and also one that will withstand, without injury, the downward thrust on the pendulum imposed by the recording device, hereinafter described. The mounting which we describe immediately below has been found particularly satisfactory for the purpose set forth and will therefore be taken as our preferred form.

The supporting table comprises a ring 35 secured to the capsule by means of screws 36, see Fig. 4, threaded into the ring through the shell 18, and a supporting bushing 37 resting on ring 35 and secured thereto by means of screws 38. Bushing 37 has an upwardly tapering opening 39 sufficiently large to permit swinging of the pendulum throughout its range of movement. Seated upon internal annular flange 37a of bushing 37 is a bearing ring 40 having a plurality of integral radially inwardly extending ribs 40a having upper inclined faces on which the spherical knob 33 has bearing. It is found that this form of pendulum bearing is particularly suitable for the present purposes in that binding in the bearing is done away with and the pendulum is rendered very sensitive to slight variations in vertical inclination of the instrument. The pendulum is held against upward vertical displacement in its bearing by means of retention ring 42 having an inner shoulder 42a which may bear slightly against the upper surface of the ball 33, though not to such a degree as to interfere with the free movement of the pendulum. Bearing ring 40 and retention ring 42 are securely held in place within the bushing by means of screws 60a threaded into flange 37a of the latter.

The pendulum carries an integral arm 43 extending vertically above the enlargement 33, the arm carrying on its upper end means for marking upon or forming an impression in the recording element, as will be later described. Such marking means may conveniently comprise a die in the form of a cap 44 having serrations 45 at its upper end, and having a center punch 46 in alinement with the longitudinal axis of the pendulum. Serrations 45 are provided essentially for the purpose of gripping the recording segment so as to take the strain from the center point.

A plunger 46 is carried in the upper end of the capsule, the plunger rod 47 extending through a packing gland 48 in the end of the capsule. The packing gland is conveniently formed by the cupped bushing 21 within which is placed an assembly of V-shaped gaskets 48 compressed by means of a correspondingly shaped plug 49 threaded in the upper end of the bushing. This form of packing is particularly suitable for preventing the leakage of high pressure fluid into the capsule, in that leakage between the plunger rod and plug 49, or leakage through the threaded connection of the latter with the bushing, is resisted by the tendency of the sides of the V-shaped gaskets to be spread outward into tight engagement with the plunger rod or bushing by the pressure of fluid reaching them. Also plug 49 has a wedging effect on the gaskets, tending to spread them into fluid tight engagement with the plunger rod and the inner wall of the bushing.

The plunger rod carries on its upper end a head 50, the sides 50a of which are tapered upwardly in order that as the head is lowered from the position of Figure 2, in which the tapered end of the head projects substantially within the bushing bore, to that of Figure 3, the area of the circulating fluid passage between bore 24a and the piston head may constantly increase. Or in other words, the plunger head, while in its upper position, restricts the fluid passage to a certain extent. Head 50 carries on its upper end a normally upwardly opening cup-shaped washer 52, formed of suitable flexible material particularly resistant to water, such as hydraulic leather. The washer is of such flexibility as to permit it to become spread from its normal upstanding position of Fig. 2, to that of Fig. 3, upon the application of fluid pressure from the drill pipe, for reasons that will later appear in the description of the operation of the instrument. Downward movement of the plunger is resisted by a coil spring 62 encircling rod 47, the lower end of the spring bearing on the top of the capsule, and the upper end being confined within annular recess 63 in the bottom of the plunger head and bearing against the downwardly facing shoulder 50b of said head. As will later be noted, spring 62 may be of such strength as merely to support the plunger assembly, or it may be of such greater strength as to resist downward movement of the plunger to a comparatively higher degree.

The plunger rod carries on its lower end within the capsule, a cylindrical block or platen 53 having a spherical recess 54 formed in its lower end. Block 53 serves as a carrier for a recording element 55 in the form of a segmental spherical and preferably metallic shell, the curvature corresponding to the length of the pendulum arm 43 from its center of swinging. Segment 55 is held in place within the recess 54 by means of retention collar 56 threaded on the lower reduced end of the carrier block. The plunger is limited in its downward movement by the engagement of an annular shoulder 58 on the block 53 above its lower reduced end, with a shoulder 59 in the wall of the capsule formed by counter-boring the shell from its upper end. The plunger thus is permitted to move downward only to the point at which the marking die is firmly impressed in the face of the recording segment, the lower limit of travel of the plunger being the same for all possible points of engagement between the marking die and spherical segment since the radius of curvature of the latter is equal to the distance of the die from its center of swinging, or the radial center C of ball 33. As shown in Fig. 5, reading of the die impression on the recording segment may be facilitated to determine the inclination by having the segment marked with a plurality of circles 61 at suitable radial intervals and concentric about the center of the segment, which, when the instrument is in a true vertical position is in alinement with the longitudinal axis of the pendulum. Generally it will be desirable to form the recording segment and marking die respectively of relatively soft and hard metals.

As previously mentioned, the plunger is adapted to be locked at the limit of its downward movement in order to lock the marking die and recording segment in engagement until the instrument may be opened for inspection, this being desirable in order to prevent the pendulum from being thrown about as drilling is carried on subsequent to the recording operation. Although any suitable means may be provided for so locking the plunger, I have shown as typical, a plurality of locking devices, generally indicated at 60, in the wall of the capsule, which devices are adapted to coact with block 53 to lock the latter at the point of engagement between shoulder 58 on the block and shoulder 59 in the wall of the capsule.

Cut into the outer face of block 53 is a plurality of circumferentially spaced grooves 65 which are cut to a somewhat greater depth at their upper ends to form shoulders 66. Each of the locking devices 60 comprises a locking pin 67, see Fig. 7, having a tubular shank 67a extending within bore 68 of plug 69 threaded through the wall of the capsule opposite grooves 65 in the carrier head. The locking pin 67 projects within groove 65 and is urged radially inward by means of coil spring 70 in the plug bore. In addition to serving as a lock, pin 67 also serves as a key preventing turning of the carrier within the capsule. Thus when the plunger assembly has moved downward to the point at which the marking die is pressed into the recording segment, pin 67 snaps into the upper end of groove 65 above shoulder 66, thereby locking the recording segment in engagement with the marking die until the plunger or block is manually released by removing plug 69 and the locking pin.

The capsule preferably is filled with a suitable fluid lubricant, for instance a fairly light oil, before sealing. In order to provide means whereby a certain amount of the lubricant within the capsule may escape due to the displacement of carrier block 53 as it is forced downward, a relief check valve 701 is inserted in the bottom closure 19 of the capsule, the valve permitting the lubricant to escape from the capsule but preventing well liquid from being taken into the capsule.

In the operation of recording vertical inclination by the present instrument, the drill pipe, with the instrument carried thereon as described, is lowered into the well to the depth at which drilling or reaming operations are to be resumed. The circulating fluid pumps are then started and the drilling fluid is forced downward under pressure against the upper end of the plunger head. As the pressure is applied against cup washer 52, the latter tends to become spread downwardly over the head to such an extent that its outer lip comes in more or less close proximity to the wall of bushing bore 24a, thereby restricting the flow through the bore to such an extent that the increased pressure forces the plunger assembly downward to the point at which the recording segment engages the marking die, and at which point the carrier block becomes locked by the action of pin 67, as described. Thus the pendulum becomes locked in an angular position relative to the barrel, or the well bore, which, as will be readily understood, represents the vertical angular inclination of the well bore in the particular region at which the record is taken. In the lowermost position of the plunger, washer 52 remains in its downwardly spread position, see Fig. 3, because of the pressure exerted by the circulating fluid. It will be noted that by virtue of the taper of the plunger head, the clearance between the bushing and the plunger, when the latter is in its lower position, is appreciably greater than the clearance before the plunger is lowered, and as a result a comparatively unrestricted flow of circulating fluid may be maintained after locking of the plunger. After operation of the recording device as described, drilling is resumed as long thereafter as may be desired, it being noted that the pendulum during this time is securely locked and prevented from becoming damaged as a result of vibratory or rotative movement of the instrument.

The purpose served by washer 52 is essentially to render the plunger readily responsive to the flow or pressure of the circulating fluid. It may be mentioned, however, that the washer may be dispensed with by increasing the circulating fluid pressure to the extent that it will force the plunger downward by virtue of the restriction offered to the flow through the bushing bore by the piston head 50 alone. Also various other changes in design of the plunger head may be made to render it responsive to the circulating fluid pressure without departure from the spirit of the invention.

As previously mentioned, the strength of spring 62 may necessarily not be greater than that required to support the plunger assembly, and consequently the latter will be forced downward as soon as circulation is started. Should it for any reason be desirable to enable circulation to be started and maintained for any length of time before operation of the recording instrument, spring 62 may be made of sufficient strength as to resist the force exerted by the circulating fluid at comparatively low pressure. In this case then the plunger may be caused to operate by increasing the circulating fluid pressure to the point at which the spring tension is overcome and the plunger forced downward to its locked position.

It may be mentioned that in its broad aspects, the invention contemplates the use of any suitable medium which may be passed downwardly through the drill pipe, for operating the plunger. And although preferably and usually the plunger actuating medium will be the circulating fluid, other plunger actuating means, such as an object dropped within the drill pipe, may be used should it be desired. This is permitted since it will be noted that in accordance with our preferred construction the upper end of the plunger is directly exposed to the drill pipe interior, so as to render it operable by the impact of some suitable object dropped within the pipe.

Thus in Fig. 8, numeral 80 indicates such an object which, in the position shown, is about to strike the plunger head and drive the plunger assembly downward to the point of engagement of the recording segment with the marking die, at which point the assembly becomes locked as described. Since the plunger is limited in its downward movement by the engagement of shoulder 58 on the carrier block with shoulder 59 in the wall of the capsule, no destructive impact caused by the object 80 striking the plunger head, will be transmitted to the pendulum.

It will be understood the drawings and description are to be considered merely as illustrative of and not restrictive on the broader claims appended hereto, for various changes in design, structure and arrangement may be made without departing from the spirit and scope of said claims.

We claim:—

1. Apparatus adapted to be carried on a well drill pipe comprising, a barrel joined to said pipe, inclination finding means within said barrel there being a fluid passage extending through the barrel past said finding means, fluid pressure controlled means for recording the position of said finding means, and means for maintaining a relatively restricted fluid flow through said passage prior to operation of said recording means and a relatively unrestricted flow after operation of the recording means.

2. Apparatus adapted to be carried on a well drill pipe comprising, a fluid tight capsule supported by said pipe, inclination finding means within said capsule, means for recording the position of said inclination means, a packing gland screwthreaded in the upper end of said capsule, and a plunger extending through said packing gland and operatively connected with said recording means, said plunger being exposed to the interior of the drill pipe and being adapted to be actuated by a medium passed downwardly through said pipe.

3. Apparatus adapted to be carried on a well drill pipe comprising, a barrel joined to said pipe, a fluid tight capsule within said barrel, a bushing in the barrel above said capsule and having a bore of comparatively reduced diameter, there being a fluid passage between the barrel and capsule, inclination finding means within said capsule, means for recording the position of said finding means, and a fluid pressure actuated plunger for operating said recording means, said plunger comprising a stem extending through the upper end of said capsule and an upwardly tapered head projecting upwardly within the bore of said bushing, a cup-shaped washer carried in the upper end of said piston, and yielding means resisting downward movement of the piston.

CLARENCE R. DALE.
LESTER C. NIELSON.